(12) United States Patent
Wijenberg et al.

(10) Patent No.: US 7,712,247 B2
(45) Date of Patent: May 11, 2010

(54) USE OF ELECTROMAGNETIC FIELDS TO AFFECT INSECT MOVEMENT

(76) Inventors: Rosanna M. Wijenberg, 26692 112th Ave., Maple Ridge, British Columbia (CA) V2W 1P7; Stephen J. Takács, Apt. #2008 - 1001 Richard Street, Vancouver, British Columbia (CA) V6B 1J6; Kevin Lam, 65-678 Citadel Drive, Port Coquitlam, B.C. (CA) V3M 6M7; Gerhard J. Gries, 484 Carlboo Cresent, Coquitlam, B.C. (CA) 43C 4X7

( * ) Notice: Subject to any disclaimer, the term of this patent is extended or adjusted under 35 U.S.C. 154(b) by 762 days.

(21) Appl. No.: 11/558,994

(22) Filed: Nov. 13, 2006

(65) Prior Publication Data

US 2007/0107297 A1    May 17, 2007

Related U.S. Application Data

(60) Provisional application No. 60/736,580, filed on Nov. 14, 2005.

(51) Int. Cl.
*A01M 1/02* (2006.01)
(52) U.S. Cl. .......................................... 43/121
(58) Field of Classification Search ................ 43/107, 43/114, 121, 132.1; 116/22 A
See application file for complete search history.

(56) References Cited

U.S. PATENT DOCUMENTS

| | | | |
|---|---|---|---|
| 4,097,838 A | 6/1978 | Fiala | |
| 4,802,057 A | 1/1989 | Patterson et al. | |
| 4,870,779 A | 10/1989 | Johnson et al. | |
| 4,982,100 A | 1/1991 | Harding, Jr. | |
| 5,030,660 A | 7/1991 | Norris et al. | |
| 5,057,316 A | 10/1991 | Gunner et al. | |
| 5,066,482 A | 11/1991 | Kohn et al. | |
| H000998 H * | 12/1991 | Gerharz | 43/124 |
| 5,274,950 A | 1/1994 | Roberts | |
| 5,302,387 A | 4/1994 | Pavne et al. | |
| 5,311,697 A | 5/1994 | Cavanaugh et al. | |
| 5,424,551 A | 6/1995 | Callahan | |
| 5,473,836 A | 12/1995 | Liu | |
| 5,560,146 A | 10/1996 | Garro | |
| 5,572,825 A | 11/1996 | Gehret | |
| 5,896,696 A | 4/1999 | Stokes et al. | |
| 5,930,946 A | 8/1999 | Mah | |

(Continued)

FOREIGN PATENT DOCUMENTS

GB    2061689 A1    5/1981

(Continued)

OTHER PUBLICATIONS

PCT International Search Report.

*Primary Examiner*—Kimberly S Smith
*Assistant Examiner*—Joshua J Michener (57) ABSTRACT

Disclosed are methods for affecting movement of an insect with respect to a specified location. One generates an electromagnetic field adjacent the location and exposes the insect to the field. Preferably the insect is a crawling insect such as a German cockroach, earwig, firebrat, or a silverfish. To attract insects, the strength of the field is not so high as to be repulsive to the insect, yet sufficiently strong as to be attractive. Such field generators are preferably incorporated into insect traps and insect bait stations.

3 Claims, 5 Drawing Sheets

U.S. PATENT DOCUMENTS

| | | |
|---|---|---|
| 6,199,315 B1 * | 3/2001 | Suzue et al. .................. 43/113 |
| 6,249,417 B1 | 6/2001 | Pippen |
| 6,574,913 B2 | 6/2003 | Takacs et al. |
| 7,541,936 B2 * | 6/2009 | Wijenberg et al. ....... 340/573.2 |
| 2003/0014907 A1 * | 1/2003 | Amburgey et al. ......... 43/132.1 |
| 2007/0068067 A1 * | 3/2007 | Ragon et al. ............... 43/132.1 |

FOREIGN PATENT DOCUMENTS

| | | |
|---|---|---|
| WO | WO 03022315 | 3/2003 |

* cited by examiner

USE OF ELECTROMAGNETIC FIELDS TO AFFECT INSECT MOVEMENT

CROSS-REFERENCE TO RELATED APPLICATIONS

This application claims priority based on U.S. provisional application 60/736,580 which was filed on Nov. 14, 2005.

STATEMENT REGARDING FEDERALLY SPONSORED RESEARCH/DEVELOPMENT

Not applicable

BACKGROUND OF THE INVENTION

The present invention relates to the use of electromagnetic fields to affect the movement of insects such as German cockroaches and firebrats. More particularly, it relates to the use of electromagnetism to facilitate attracting/repelling, trapping and/or killing of such insects.

Traditionally there have been attempts to control insect infestation through sanitation procedures (e.g. the prompt removal of potential harborages and food sources such as garbage). However, even with the utmost vigilance this often is not completely effective. For example, even a completely sanitized apartment can become somewhat infested with insects if there are surrounding apartments in the same building, and those apartments and/or a common sanitary system, remain infested.

Particularly problematic insects to completely control are crawling insects such as cockroaches. These insects are adept at infiltrating into residences through sanitary systems and cracks.

Hence, insecticides and other insect control chemicals and/or biological agents have been used to try to further control such insects. See generally U.S. Pat. No. 5,030,660 (deterrent substances), U.S. Pat. No. 5,066,482 (reproductive inhibitors), U.S. Pat. No. 5,302,387 (toxins), and U.S. Pat. No. 5,057,316 (fungal agents). The disclosure of these patents, and of the following other publications referred to herein, are incorporated by reference as if fully set forth herein: U.S. Pat. Nos. 4,802,057, 4,870,779, 5,424,551, 5,572,825, 5,560,146, 5,896,696, 5,930,946 and 6,574,913.

There have also been attempts to rely on chemical or biological attractants to lure the insects to a trap or killing station. See generally U.S. Pat. Nos. 5,572,825 and 5,560,146. For example, pheromones have been used to attract cockroaches to a trap.

While chemical/biological approaches have considerable effectiveness in many cases, they do have some drawbacks. For example, insecticides often are not effective unless the insect directly contacts the insecticide. Further, the effectiveness of chemical or biological lures typically rapidly drops with distance from a baiting station or the like. Thus, multiple baiting stations may be required for adequate coverage of even relatively small residences or patio areas. Also, if the luring system requires an odorous volatile to be dispensed from a trap, consumers who find such odorants undesirable may not prefer that approach.

An alternative, very different, approach to insect control is to provide a large scale release of sterile insects. While this approach has been of some success on cargo ships and in certain agricultural and industrial settings, it is not desirable for application in residential settings. Homeowners are not typically willing to expose their families to a substantially increased infestation, notwithstanding the promise of future control of the insects.

There have also been attempts to attract certain insects, particularly flying insects, using visible lights of certain wavelengths. However, these light-based attractants typically are also visible to consumers, and/or have an undesirable sound associated with their generation or use, which has undesirable aesthetic effects.

In U.S. Pat. No. 6,574,913 there was a discussion of using sonic signals in combination with chemicals to improve attraction of certain insects. See also U.S. Pat. No. 5,424,551 regarding exposing varied animals to particular selected frequencies. Apart from audible sounds possibly annoying some consumers, certain sounds can spook other types of insects (and thus repel them).

There have also been teachings that use of pulsed electromagnetic fields act to repel certain insects and other pests. See generally U.S. Pat. No. 4,802,057 (rodents), U.S. Pat. No. 4,870,779 (rodents and insects), and U.S. Pat. No. 5,930,946 (cockroaches). See also U.S. Pat. No. 5,896,696. This would teach away from applying electromagnetic fields as an attractant, and in any event indicate that pulsing is important in causing repelling.

Hence, there is a need for improved, low cost, insect trapping and killing devices which are suited to use in a residential environment.

BRIEF SUMMARY OF THE INVENTION

In one aspect the invention provides a method for affecting movement of an insect with respect to a specified location. One generates an electromagnetic field adjacent the location and exposes the insect to the field. In one form, the insect can thereby be attracted towards the specified location (typically towards the field generation source). In another form, the insect may also remain near the specified location (as it is "arrested" by the field). The insect can also be repelled away from the specified location (typically away from the field generation source).

Preferably, the controlled insect is a crawling insect, more preferably a cockroach, even more preferably a German cockroach (*Blattella germanica*). The insect may also be a firebrat, earwig, silverfish, and possibly also other insects. By the term "insect" we mean not only those invertebrates classically referred to as insects. We also mean to include those pests commonly controlled with insects (e.g. spiders and centipedes).

Importantly for insect attraction, the electromagnetic field can have an intensity that is not so high as to be repulsive to the insect, yet sufficiently strong as to be attractive. This will typically be in the range of 0.0001 mT to 1.0 mT, most preferably in the range of 0.02 mT to 0.05 mT.

We intend that the electromagnetic field be positioned adjacent to or in an insect control device selected from the group consisting of insect traps, insect baiting stations containing an insect toxin, and insect indicator stations. For example, a wide variety of conventional insect traps for crawling insects can be retrofitted with an electromagnetic field generator. Consider for example applying such a generator to a central location of a trap of U.S. Pat. No. 5,572,825. Such a device could have the electromagnetic field generator, with or without a chemical or biological attractant.

Alternatively, the device can be a baiting station provided with a conventional insect toxin. The toxin is not critical, and in any event can be an appropriate conventional toxin of the type suitable for the insect of interest (e.g. boric acid powder in the case of a cockroach).

Such a device may be designed to retain the insect that has been attracted and killed. Alternatively, the device may be designed so that the insect feeds on or otherwise contacts a slow acting poison, regardless of whether the poisoned insect remains in the device after being poisoned.

Alternatively, the device may be for purposes of monitoring whether an infestation exists in a building or other area, rather than for by itself completely controlling the infestation. For example, a commercial pest control company might place such a device in a room. Then, after a day or so has passed, the device could be checked to see if any insects are in it. If insects are found, a further insect control treatment could be implemented (e.g. a general spraying). If no insects were found, no further treatment would be provided in that area.

Apart from the attractant capability of the electromagnetic field (as described herein), the device may be supplemented with additional attractants selected from the group consisting of chemical attractants, food attractants, and/or acoustic attractants for the insect. Chemical and food attractants should be selected so as to be optimal for the type of infestation suspected, as is well known in the art. For example, a cellulose-based attractant might be used for a termite.

Where the insect responds to particular acoustic signals, an acoustic generator can be used as well (e.g. particular sounds such as clicks produced by German cockroach nymphs).

The electromagnetic field is preferably selected from the group consisting of a field generated with an AC electromagnetic field generator, a field generated with a random frequency AC electromagnetic field generator, a field generated with a DC electromagnetic field generator, a field generated with a fluctuating DC electromagnetic field generator, a field generated with a permanent magnet, and a field generated with a white noise generator. Frequencies in the range of 20 to 20,000 Hertz are particularly desirable in the case of German cockroaches for attraction. Within this frequency range, a single frequency or a combination of frequencies may be emitted sequentially or concurrently.

Another aspect of the invention provides an insect control apparatus. There is a housing, an electromagnetic field source positioned adjacent to or in the housing, and at least one way for an insect to access the housing. The electromagnetic field source is capable of generating an electromagnetic field having an intensity/strength within an attracting range for the insect. Most preferably the insect control apparatus is a cockroach trap and the electromagnetic field source is capable of generating an electromagnetic field having a strength between 0.0001 mT and 1.0 mT.

Where the field generator is other than a permanent magnet, there will typically be a power source for the electromagnetic field. It may be a plug-in electrical cord. However, it is preferred that the power source is a battery or other electrical power source which provides greater flexibility in the placement of the device. For example, in the case of a device to be used outdoors, a solar cell might be used to power the generator.

The electromagnetic field generator can be deployed on its own to draw pest insects towards a selected site (and thus away from another site). Thus, regardless of whether there is trapping or toxic capability, or even monitoring capability, having such a device at one position can keep pest insects away from another (e.g. where a picnic is being held).

Where there is also a device such as a trap, it may contain a toxic agent to kill entering insects. The trap can alternatively have openings which enable insects to easily enter the trap yet have difficulty leaving (e.g. a tapered opening).

We report below our successful experiments with certain cockroaches, and with respect to earwigs, firebrats, and silverfish, of varied sex and age. We also report below our successful experiments with electromagnetic fields generated in different ways.

It will be appreciated that the present invention provides improved methods for controlling insects, and devices for practicing these methods. These devices are particularly well suited for use in residential environments to control German cockroaches. These devices permit luring of insects at significant distances from the device. They can be produced and operated at relatively low cost. Further, they help avoid adverse aesthetics which are present in a variety of prior art devices.

The foregoing and other advantages of the present invention will be apparent from the following description. In the description that follows reference is made to the accompanying drawings which form a part thereof, and in which there is shown by way of illustration, and not limitation, expected preferred embodiments of the invention. Such embodiments do not necessarily represent the full scope of the invention, and reference should therefore be made to the claims herein for interpreting the scope of the invention.

DETAILED DESCRIPTION OF THE INVENTION

Experiment 1

Figure 1:
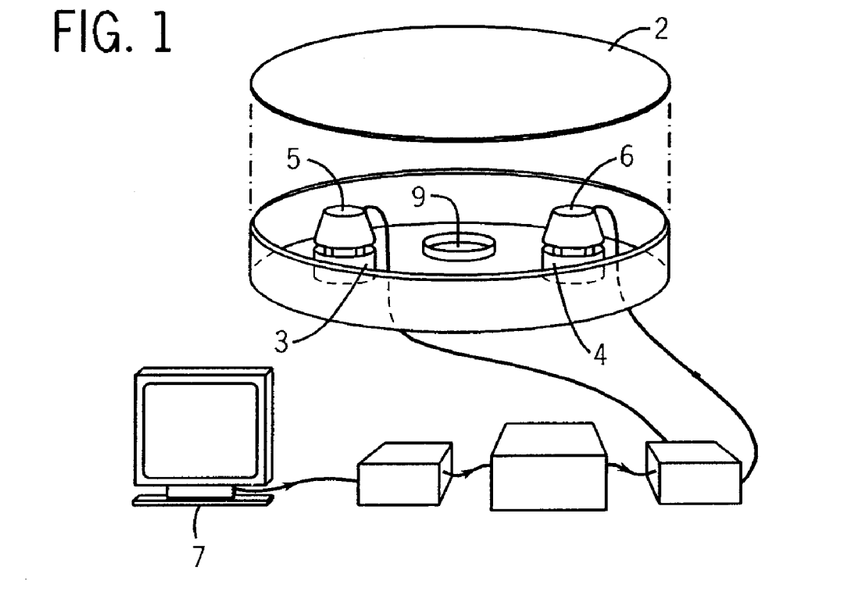
FIG. 1 schematically illustrates how our experiment 1 was conducted.

As depicted in FIG. 1, we exposed female German cockroaches to white noise, and to the electromagnetic field associated therewith. There was a plastic arena 2 in which were placed two "shelters" 3 and 4 equidistant from each other and the center. The shelters were constructed from aluminum, albeit they were topped with an inverted plastic cup on props.

Each cup contained a headphone speaker 5, 6 that was connected to a computer 7 having a white noise generator. A white noise signal (frequency 20-20000 Hz), was sent through relays and amplifiers, and then directed to a selected one of the speakers while the other speaker was left inactive and thus functioned as a control. As a result, during the experiment one of the speakers was emitting a Gaussian white noise auditory signal (±0.5 volts, 55 dB) as well as the associated electromagnetic field, while the other speaker was emitting no auditory signal and no electromagnetic field. The treatment stimulus was alternated between replicates.

For each of six replicates, forty German cockroaches were released in the center of the arena 2 from a Petrie dish starting point 9. At the end of the experiment the positions of the cockroaches were analyzed. In particular, we looked for insects that were in or within 2.5 cm of a particular shelter.

Figure 6:
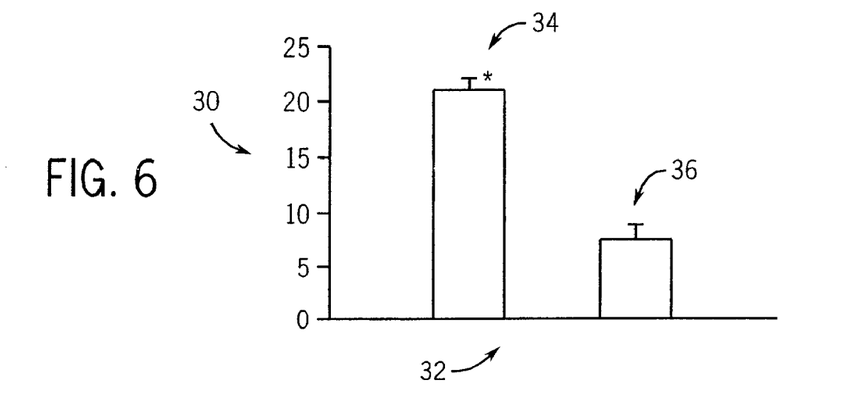
FIG. 6 graphically illustrates the results of experiment 1.

Experiment 1 revealed that German cockroaches were significantly more attracted to a shelter associated with the electromagnetic field and white noise than to an equivalent shelter not having this property. In this regard, FIG. 6. graphically illustrates mean numbers of female German cockroaches recorded in experiment 1 shelters associated with white noise or silence. Vertical axis 30 shows the mean (+SE) number of insects in containers beneath the speakers and horizontal axis 32 shows the treatment. Bar graph 34 indicates the mean number of insects in containers beneath the speaker emitting white noise. Bar graph 36 indicates the mean number of insects in containers beneath the speaker not emitting white noise. The asterisk indicates a significant preference for the treatment stimulus. ANOVA (arcsin proportion; $\alpha=0.05$).

Experiment 2

In experiment 2 (FIG. 2) we used a somewhat similar experimental setup. However, instead of aluminum shelters, two hollow glass cylinders 14 were placed in the arena 12 horizontally and equidistant from each other and the arena center. We use this equipment to test the effect of a low-level alternating current (AC) driven electromagnetic field (without an audible component) for attraction and arrestment of German cockroaches.

Figure 2:
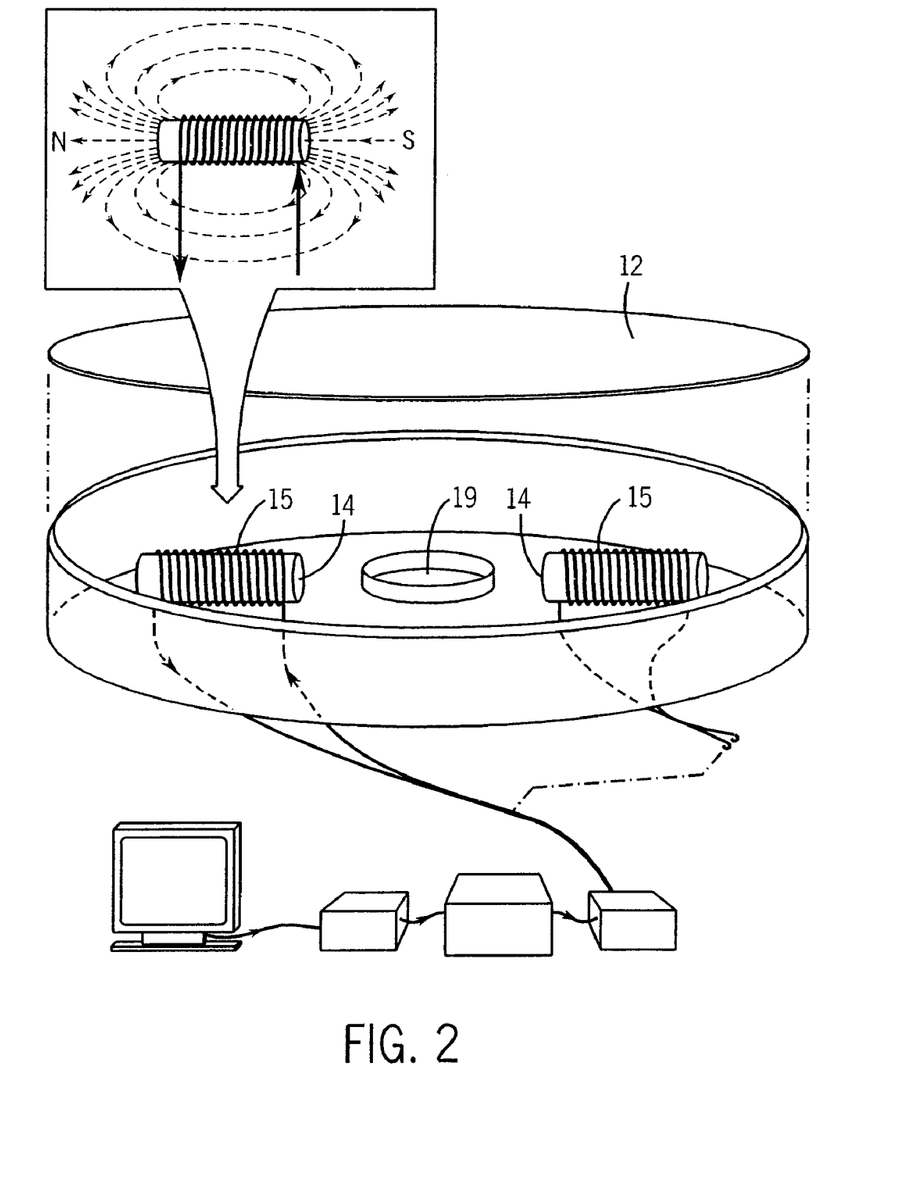
FIG. 2 schematically illustrates how our experiment 2 was conducted.

Each cylinder 14 was wrapped in electrical wire 15 (enamel coated, 28 gauge) to create a coil. (resistance: ≈21 ohms, diameter: 4.7 cm). The treatment coil received a Gaussian white noise signal (±0.5 volts) via a computer with a white noise generator (see above). This coil generated an AC-driven electromagnetic field (EMF) (<0.05 mT within the coil) of random frequency (20-20000 Hz). The auditory component of the white noise signal was not emitted. The control coil received no white noise signal and generated no electromagnetic field. Positions of the coil in the arena and assignments of treatment and control stimuli were alternated between replicates. For each of six replicates, thirty German cockroaches were released into the center of the arena from the Petrie dish 19.

Figure 7:
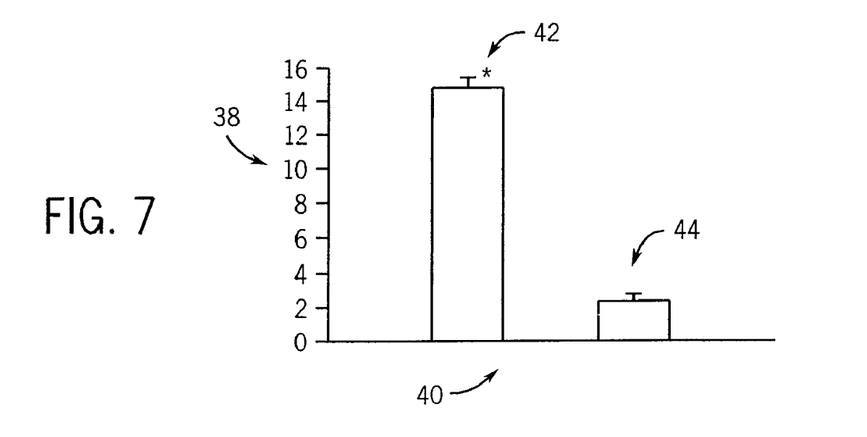
FIG. 7 graphically illustrates the results of experiment 2.

Experiment 2 revealed that coils associated with AC-driven electromagnetic fields, particularly those <0.05 mT, were significantly more effective in attracting or arresting these German cockroaches than were control coils without EMFs. In this regard, FIG. 7. graphically illustrates numbers of female German cockroaches recorded in experiment 2 in coils with or without fluctuating AC-driven electromagnetic fields. Vertical axis 38 shows the mean (+SE) number of insects in coils and horizontal axis 40 shows the treatment. Bar graph 42 indicates the mean number of insects in coils emitting a fluctuating AC-driven electromagnetic field (<0.05 mT within the coil). Bar graph 44 indicates the mean number of insects in coils not emitting a fluctuating AC-driven electromagnetic field. The asterisk indicates a significant preference for the treatment stimulus. ANOVA (arcsin proportion; $\alpha=0.05$).

Experiment 3

Using similar experimental procedures to experiment 2, albeit with an electromagnetic field at greater strength (0.05-1 mT) we determined that alternating current electromagnetic fields in this range also was attractive, albeit in this range the insects preferred to aggregate under the coil rather than inside.

Figure 8:
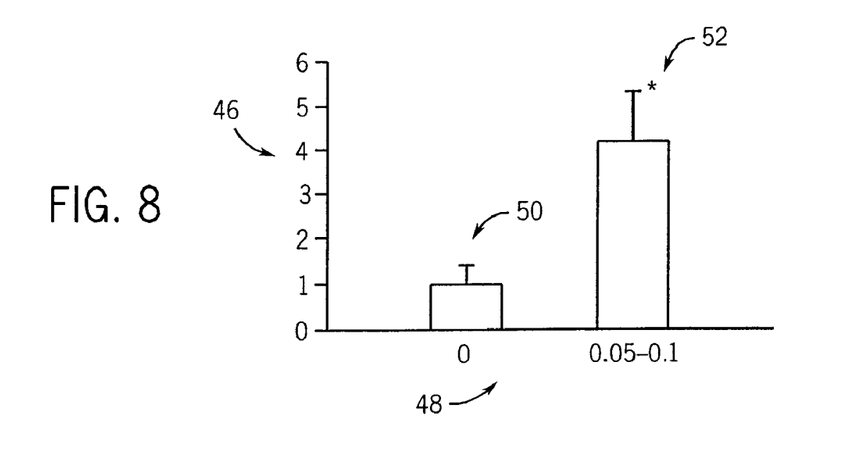
FIG. 8 graphically illustrates the results of experiment 3.

FIG. 8 graphically illustrates numbers of female German cockroaches recorded in experiment 3 in and/or under coils with or without fluctuating AC-driven electromagnetic fields. Vertical axis 46 shows the mean (+SE) number of insects in and/or tinder coils and horizontal axis 48 shows the treatment. Bar graph 50 indicates the mean number of insects in and/or under coils not emitting a fluctuating AC-driven electromagnetic field. Bar graph 52 indicates the mean number of insects in and/or under coils emitting a fluctuating AC-driven electromagnetic. The asterisk indicates a significant preference for the treatment stimulus. ANOVA (arcsin proportion; $\alpha=0.05$).

Experiment 4

In experiment 4 we confirmed that low-level fluctuating direct current electromagnetic fields also attract German cockroaches. Here we used a similar experimental design except that the white noise signal was copied to CD and emitted from a portable CD player powered by rechargeable batteries. This coil generated a fluctuating DC-driven electromagnetic field (<0.02 mT within the coil) of random frequency (20-2000 Hz). The auditory component of the white noise signal was not emitted. This again led to results evidencing that the field attracted the insects.

Figure 9:
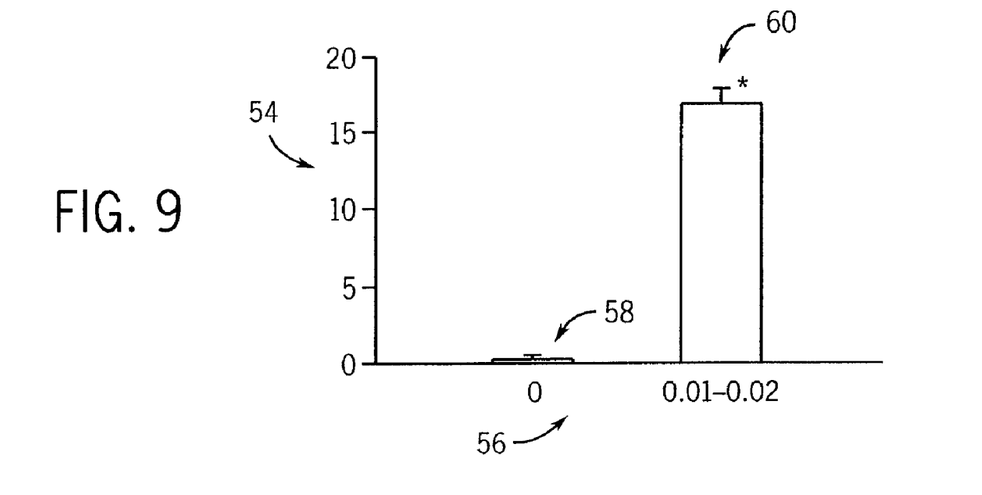
FIG. 9 graphically illustrates the results of experiment 4.

FIG. 9 graphically illustrates numbers of female German cockroaches recorded in experiment 4 in coils with or without fluctuating DC-driven electromagnetic fields. Vertical axis 54 shows the mean (+SE) number of insects in coils and horizontal axis 56 shows the treatment. Bar graph 58 indicates the mean number of insects in coils not emitting a fluctuating DC-driven electromagnetic field. Bar graph 60 indicates the mean number of insects in coils emitting a fluctuating DC-driven electromagnetic field. The asterisk indicates a significant preference for the treatment stimulus. ANOVA (arcsin proportion; $\alpha=0.05$).

Experiment 5

Experiment 5 tested whether low-level static direct current (DC) driven electromagnetic fields also attracted German cockroaches. The experimental setup was similar except that current was driven through a coil using a battery with an attached rheostat to reduce the outgoing voltage to 200-500 mV. The coil generated a static DC-driven electromagnetic field. This again led to results evidencing that the field attracted the insects.

Figure 10:
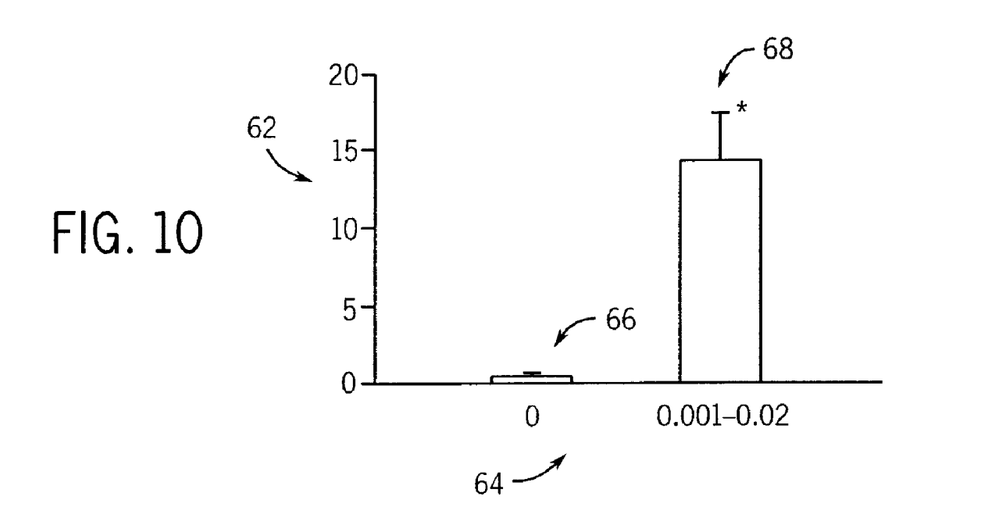
FIG. 10 graphically illustrates the results of experiment 5.

FIG. 10 graphically illustrates numbers of female German cockroaches recorded in experiment 5 in coils with or without static DC-driven electromagnetic fields. Vertical axis 62 shows the mean (+SE) number of insects in coils and horizontal axis 64 shows the treatment. Bar graph 66 indicates the mean number of insects in coils not emitting a static DC-driven electromagnetic field. Bar graph 68 indicates the mean number of insects in coils emitting a static DC-driven electromagnetic field. The asterisk indicates a significant preference for the treatment stimulus. ANOVA (arcsin proportion; $\alpha=0.05$).

Experiment 6

Experiment 6 conducted similar tests with respect to varied firebrats. Here current was driven through a coil using a battery with an attached rheostat to reduce the outgoing voltage to 200-500 mV. This coil generated a static DC-driven electromagnetic field (<0.11 mT within the coil). This experiment confirmed that the effect worked with male, female, and nymph firebrats.

Experiment 7

Experiment 7 conducted similar tests with respect to earwigs. Here current was driven through a coil using a battery with an attached rheostat to reduce the outgoing voltage to 200-500 mV. This coil generated a static DC-driven electromagnetic field (<0.11 mT within the coil). This experiment confirmed that the effect worked with male and female earwigs.

Experiment 8

Experiment 8 conducted similar tests with respect to silverfish. A coil 30 generated a static DC-driven electromagnetic field (<0.11 mT within the coil). This experiment confirmed that the effect worked with male, female, and nymph silverfish.

It is expected that for each type of crawling insect an optimal range of field strength will exist. Too strong a field strength will likely repel insects, particularly if the field is pulsed. Too weak a strength will not be commercially effective as an attractant. For the insects successfully tested thus far the appropriate field strength has been in the range of 0.02 mT to 1.0 mT.

Experiment 9

We have also tested the principles of the present invention on brown banded cockroaches. We have confirmed the ability of devices of the present invention to attract them.

Experiment 10

For oriental cockroaches, we have confirmed the ability of the devices of the present invention to repel them at settings that attract other cockroaches even absent pulses.

We have detected insect-produced electromagnetic fields, particularly dipolar magnetic fields. We hypothesize that the insects produce the electromagnetic fields to communicate. The particular electromagnetic field of a certain type of insect can be sensed and then that electromagnetic field can be reproduced by an electromagnetic field source thereby mimicking the insect. Characteristics (e.g., field strength and frequency) of the reproduced magnetic field can be varied to achieve a desired result (e.g., attracting or repelling the insects).

Figure 3:
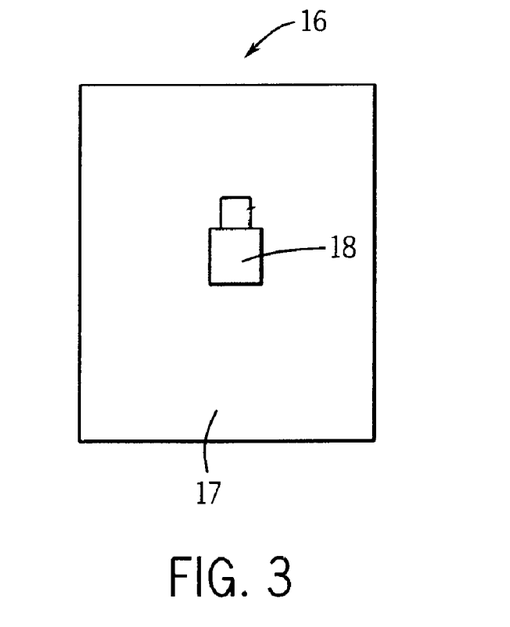
FIG. 3 is a schematic top view illustration of one possible insect trap of the present invention, of the glue trap type.

FIG. 3 schematically depicts an insect control trap 16 of the present invention having a wall 17 coated with an adhesive of the type conventionally used for glue traps. An electromagnetic field generator 18 is centered on the trap, and is designed to emit an electromagnetic field of a strength within the range of 0.0001 mT to 1.0 mT. This generator 18 may be a permanent magnet, or alternatively be a field generated by a device powered by a small battery (not shown).

Here, the wall 17 is preferably coated with a pheromone of the type known to attract cockroaches. The electromagnetic field and the pheromone cooperate to attract cockroaches and certain other pest insects. When an insect crawls or lands on the wall 17, they are trapped on the device, and thereby ultimately killed.

Figure 4:
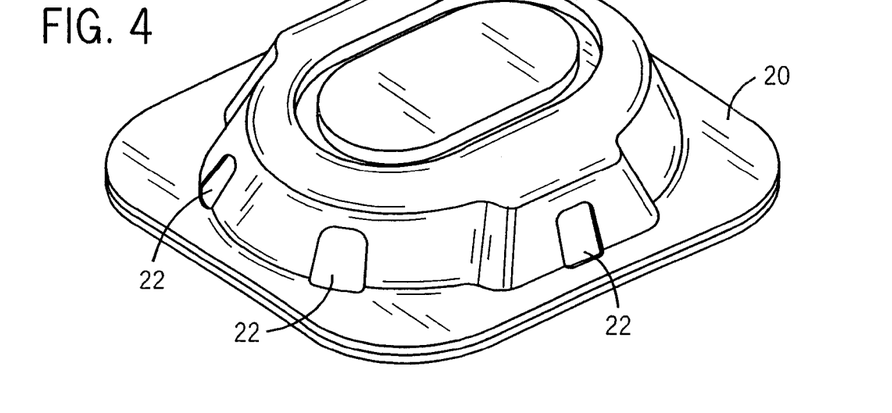
FIG. 4 is a top, frontal perspective view of another insect trap of the present invention, of the toxic bait type.
Figure 5:
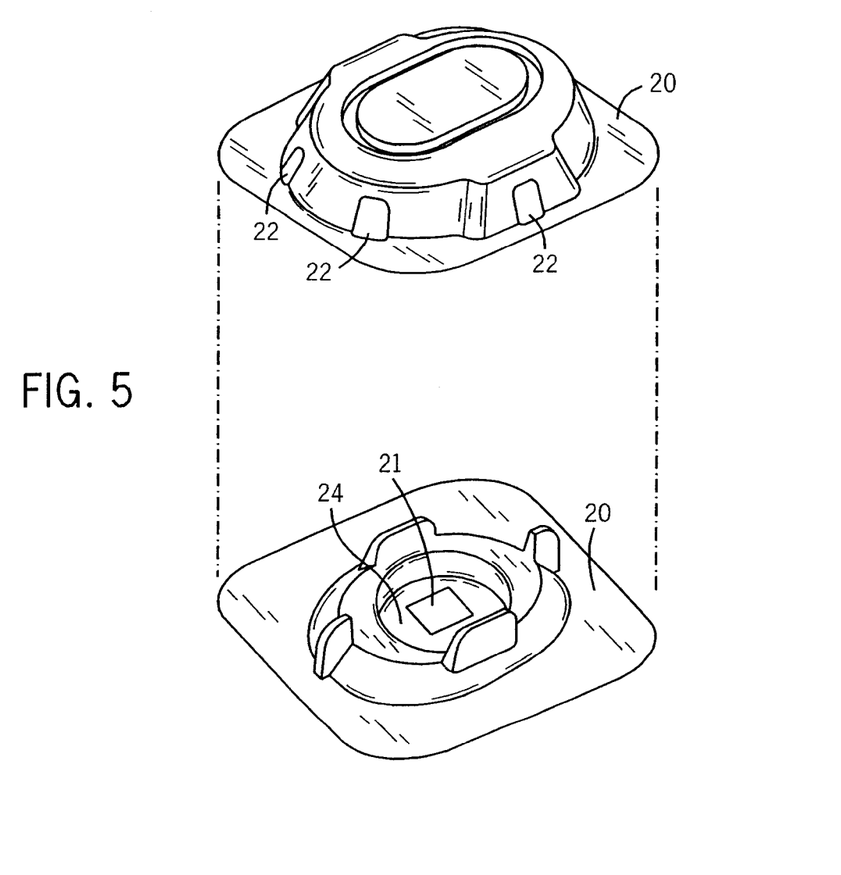
FIG. 5 is an exploded perspective view of the FIG. 4 device.

FIGS. 4 and 5 disclose an insect trap which uses a toxic bait, rather than an adhesive, to control the insect. Here there is a housing 20 with entryways 22 sized to allow an insect such as a cockroach to enter. An electromagnetic field source 21 is positioned inside the housing 20. There is a baiting material 24 such as food material that is mixed with an insect toxin. Insects are attracted by the electromagnetic field source 21, as well as the food attractant, into the housing 20. They then ingest or otherwise come into contact with the toxin, and are thereby controlled.

A wide variety of baits may be suitable for use in connection with the present invention. By way of example, and not limitation, these may include boric acid bait, propoxor bait, sulfuramid bait; chlorpyrifos bait, and hydramethylnon bait.

Similarly, a wide variety of insect toxins are useful in connection with the present invention. By way of example and not limitation, some toxins suitable for use inside residential buildings include allethrin aerosol bendiocarb dust; boric acid dust and aerosol; chlorpyrifos spray, dust and aerosol; cyfluthrin spray; diatomaceous earth dust; deltamethrin, dichlorvos aerosol; fenoxycarb aerosol; allethrin aerosol; fenvalerate aerosol; hydroprene aerosol; malathion spray; methoprene spray and aerosol; permethrin spray, aerosol and dust; phenothrin aerosol; propoxur aerosol; resmethrin aerosol; sumithrin aerosol; synergized pyrethrins spray and aerosol; and tetramethrin aerosol. Examples of toxins suited for use outside buildings include (without limitation) carbaryl spray; chlorpyrifos spray and dust; fenvalerate spray and aerosol; malathion spray; and permerthrin spray.

While a number of embodiments of the present invention have therefore been described, it should be appreciated that there are numerous other embodiments of the invention within the spirit and scope of this disclosure. Hence, the invention is not to be limited to just the specific embodiments shown or described.

INDUSTRIAL APPLICABILITY

Provided herein are insect traps and other insect control devices particularly well suited for use in residential locations to control German cockroaches and certain other insects.

We claim:

1. A method for affecting movement of an insect with respect to a specified location, comprising:
    positioning at the specified location an apparatus selected from the group consisting of insect traps, insect baiting stations, and insect indicator stations;
    wherein at the apparatus the insect is trapped, killed or monitored;
    generating an electromagnetic field adjacent the location and exposing the insect to the field;
    whereby the insect is attracted towards the specified location;
    wherein the intensity of the magnetic field is in a range of 0.0001 mT to 1.0 mT;
    wherein the insect is exposed to an electromagnetic field having a frequency of 20 to 20,000 Hertz; and
    wherein the insect is selected from the group consisting of German cockroaches, firebrats, earwigs, silverfish.

2. The method of claim 1 where the insect is a German cockroach.

3. The method of claim 1, wherein the intensity of the magnetic field is in the range of 0.02 mT to 0.05 mT.

* * * * *